United States Patent [19]

Belmont

[11] 3,920,893

[45] Nov. 18, 1975

[54] TELEVISION APPARATUS TO PROVIDE SUPPLEMENTARY DISPLAY IMAGES

[76] Inventor: Elliott T. Belmont, R.F.D. 56, Katie Ford Road, Chatham, Mass. 02633

[22] Filed: July 1, 1974

[21] Appl. No.: 484,941

[52] U.S. Cl. .............................................. 178/7.5 R

[51] Int. Cl.$^2$ .......................................... H04N 5/44

[58] Field of Search ........... 315/1; 178/7.5 D, 7.5 R, 178/7.8, 7.85, 7.9, 7.91; 340/343; 313/364, 461

[56] References Cited

OTHER PUBLICATIONS

Noll, Television For Radiomen, The Macmillan Company, 1955, pp. 198–202, 208.

*Primary Examiner*—Benedict V. Safourek
*Assistant Examiner*—John C. Martin
*Attorney, Agent, or Firm*—Joseph S. Iandiorio

[57] ABSTRACT

Television apparatus to provide a supplementary display image has a switch control apparatus actuated by a solenoid, and has a neon tube unit which latter provides, when electrically connected, an image other than the usual television image. Said switch control apparatus is connected to a switch that is connected to the usual anode of a picture tube and to said neon tube unit, said switch being automatically closed by said control apparatus when the television set is turned off.

5 Claims, 7 Drawing Figures

TELEVISION APPARATUS TO PROVIDE SUPPLEMENTARY DISPLAY IMAGES

The principal object of my invention is to utilize the residual discharge voltage in a television set, when the latter is turned off, to momentarily display an image, by means of a neon tube unit connected to the usual television tube.

Another object is to hold said switch open by means of control apparatus that is connected to the usual filament electrical supply pins, and which control apparatus releases said switch to closed position when the usual television set is turned off.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my invention.

Figure 1:
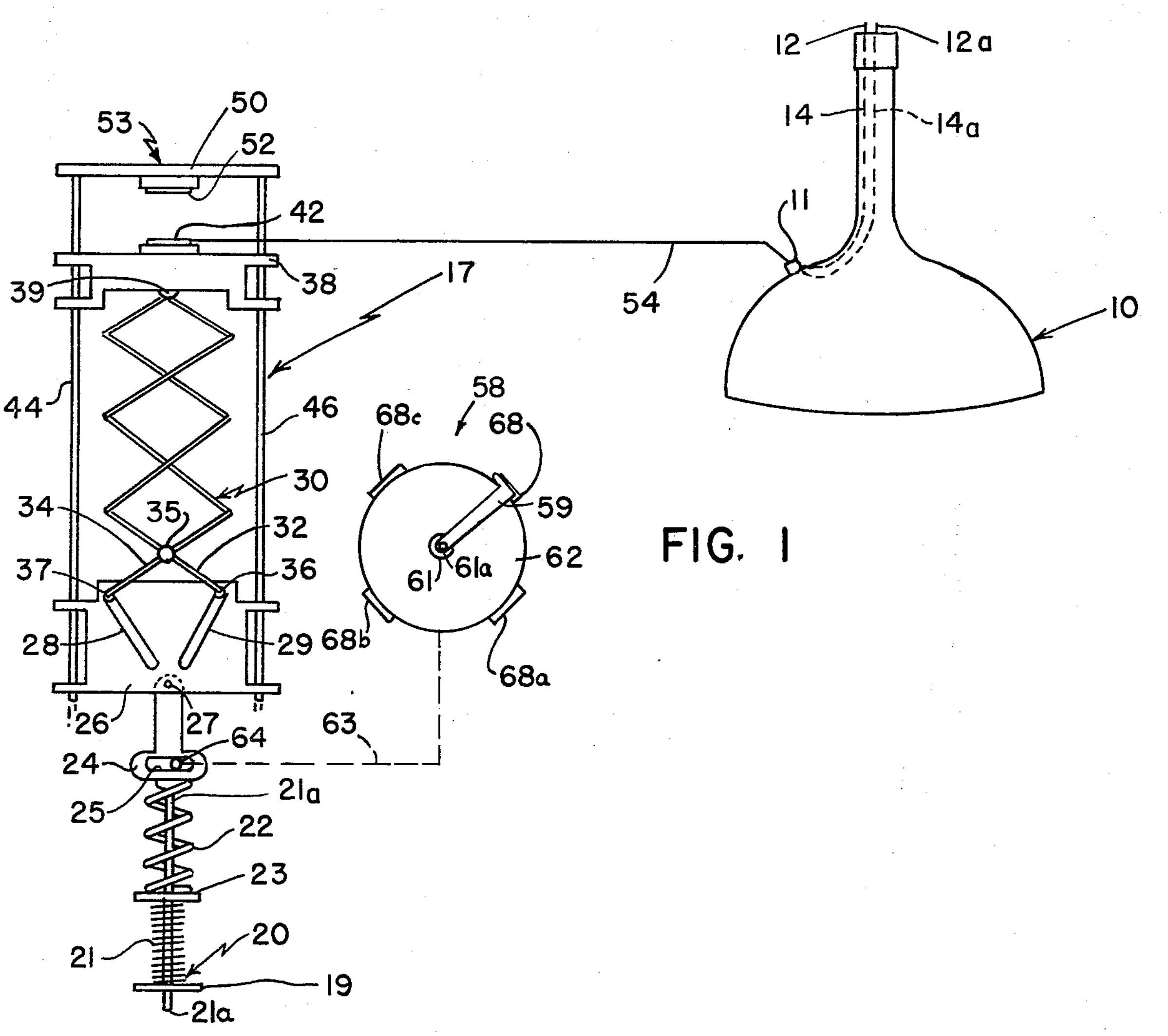
FIG. 1 is a diagrammatic view of my television apparatus including switch control means greatly enlarged, and having a switch in open position, and showing a wire connected to the anode of a television tube and extending from a switch contact member to said anode.
Figure 2:
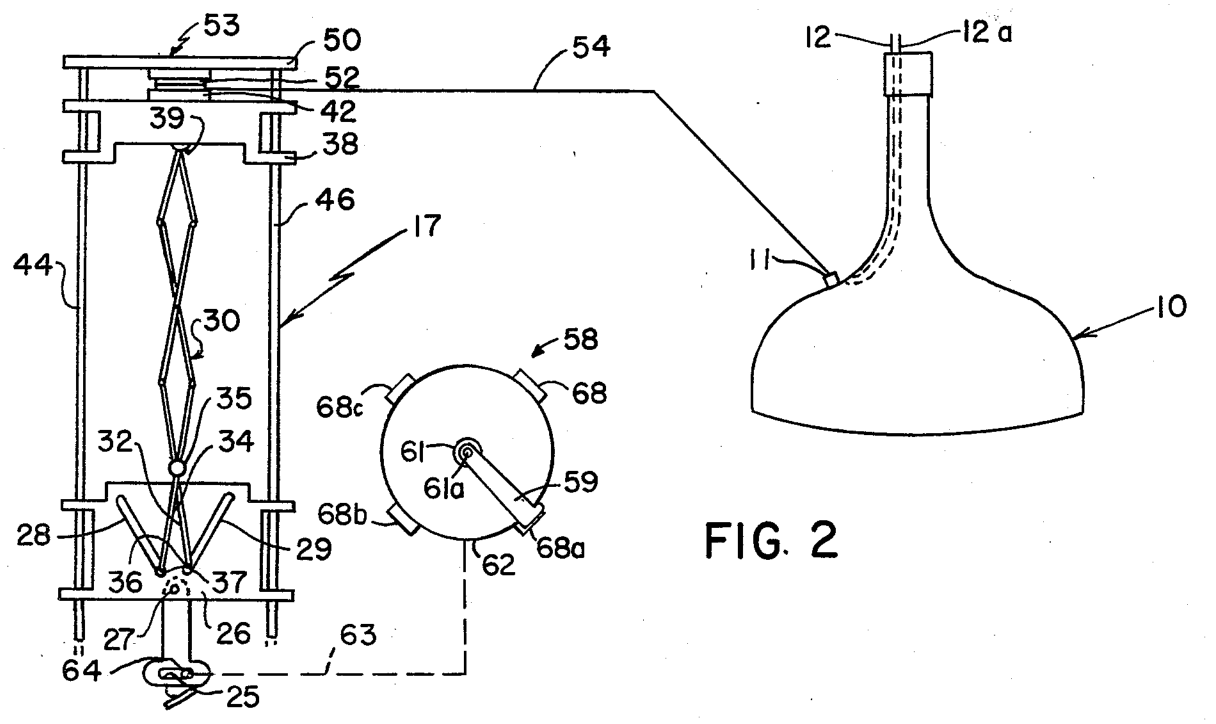
FIG. 2 is a view similar to FIG. 1, but omitting the solenoid, and showing the switch in closed position.
Figure 3:
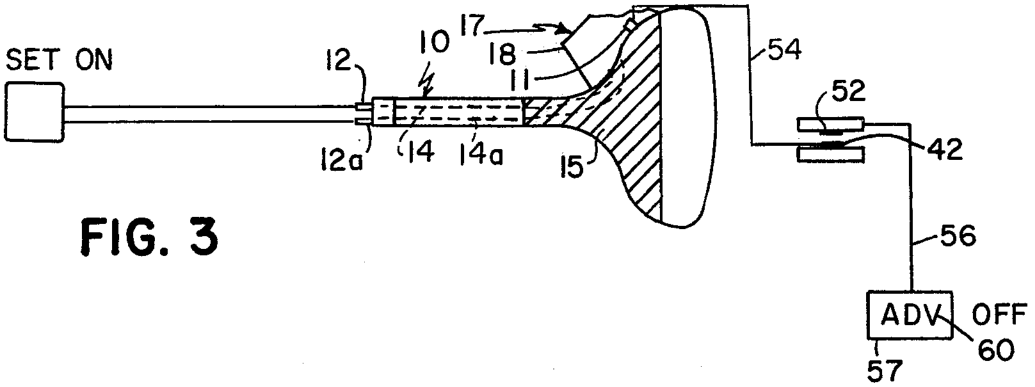
FIG. 3 is a diagrammatic view showing a television tube, connected to a control switch, shown open, and the latter connected by a wire to a supplementary neon tube unit.

As illustrated, I use the usual cathode ray picture tube 10 of any well-known televison set, and which has at its exterior a well-known anode 11, usually referred to as anode no. 2. At one end of said tube are the usual electricity conducting filament means shown as pins 12 and **12*a* to which the usual wires 14 and 14*a* respectively connect. Feed wires not shown, from an outside source provide high voltage to said anode 11. The usual aquadag coating applied to said tube is indicated at 15 in said FIG. 3**.

Attached to said tube I provide switch control apparatus 17 having a compartment 18 attached to said tube 10 that houses my supplementary display control means. The latter controls the display of an image 60 such as a legend or picture, that may momentarily serve as advertising, when the television set is turned to off-position.

Figures 4, 5, 6, 7:
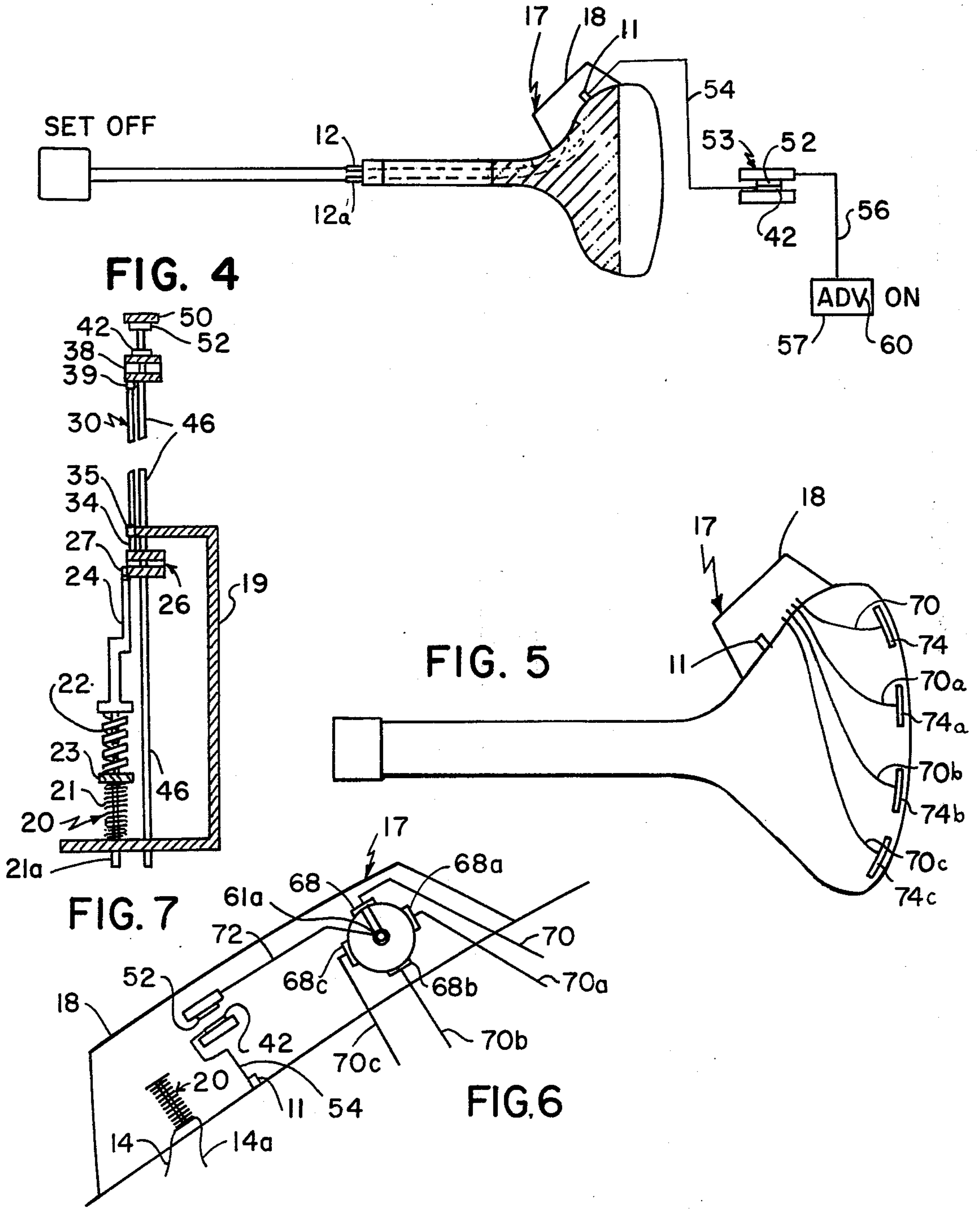
FIG. 4 is a view similar to FIG. 3, but showing the switch closed.
FIG. 5 is a diagrammatic view of a picture tube showing four supplementary neon tube units and four wires connected to them.
FIG. 6 is a fragmentary diagrammatic view showing image selective means in the form of a ratchet, including a wire extending from said switch to a contact on the ratchet and other wires extending from contacts on said ratchet to connect to said supplementary neon tube units, the latter being shown in said FIG. 5.
FIG. 7 is a fragmentary, diagrammatic view showing my switch control apparatus, the switch being shown in open position.

This control apparatus has a well-known solenoid 20 supported by a frame 19 and having the usual coil of wire 21 around a plunger **21*a*. Above said coil 21 is a compression spring 22 that bears upon a washer 23 at one end. A connector 24 is fixed on an end of said plunger 21*a*and is attached to a pusher plate 26 by a pin 27. Said spring 22 also bears against said connector 24. Said pusher plate 26 had two slots 28 and 29 extending diagonally therethrough, later referred to. Said wires 14 and 14*a*extend along the inside of tube 10 and through the tube near anode 11 is connect with solenoid 20(FIG. 6). When the television set is turned on the coil is electrified and it compresses said spring 22 and thus draws said contact 42 from contact 52** as later explained.

An actuating member 30, shown as lazy tongs, has two end connecting links 32 and 34 pivotally fastened as at 35 to said frame 19 and said links are slidable relative to said slots 28 and 29 by means of buttons 36 and 37 respectively attached thereto. From said links 32 and 34 said lazy tongs 30 extend to and are attached to a sliding plate 38 by a fixed pin 39 set in the latter. Said plate 38 carries a contact 42 and is slidable on rails 44 and 46 that are fixed, at one end, to said frame 19.

A wire 54 extends from said contact 42 to said anode 11 and thence a wire 56 extends to a neon tube unit 57 by which an image 60, such as an advertising legend or picture, is displayed momentarily, and later referred to. This image 60 is supplemental to the usual image provided by the picture tube.

Movement of said contact 42 is effected by deactivation of said solenoid 20 thus releasing said compression spring 22 whereby said lazy tongs 30 move to closing position, thus forcing upwardly said plate 38 and bringing said contact 42 into contact with said fixed contact 52.

When it is desired to have a choice of more than one supplemental image 60 to show, I provide image selective means shown as a well-known ratchet 58 having a movable conductor arm 59 that is pivotally connected, as at 61, to a fixed frame or body 62 of said ratchet, and said pivot member 61 carries a contact **61*a*to which is connected a wire 72 extending from said contact 52. Linkage 63 extends from said ratchet frame 62 to said connector 24, the latter linkage being slidably connected by a pin 64 in said slot 25 in said connector 24.**

Said fixed frame 62 carries four fixed contacts **68, 68*a*, 68*b*and 68*c*. Conductor wires 70, 70*a*, 70*b*and 70*c*extend respectively from said contacts 68, 68*a*,68-*b*and 68*c*respectively to supplemental neon tube units 74, 74*a*, 74*b* and 74*c*disposed on the inner face of tube 10 (FIG. 5**) so as to be located on the screen area of the tube.

When the television set is normally turned on, said wires 14 and **14*a*which connect with said solenoid coil 21, activate the latter, and said contact 42 and 52 are separated by drawing said plate 38 away from said top plate 50.**

In operation of my device, when said television set is turned off or electrically disconnected, the current that flows through said pins 12 and **12*a*, and wires 14 and 14*a*, to said solenoid 20 ceases, thus releasing said spring 22 which brings said switch contact members 42 and 52** together.

Residual discharge voltage now flows from said anode 11 through wire 54 to said closed contacts 42, 52, thence by said wire 56 to said neon tube 57, thus illuminating or flashing an image 60 momentarily until said residual discharge ceases.

When a plurality of images are to be illuminated in turn, said ratchet contacts are selectively included in the circuit. When the television set is disconnected, current from said pins 12 ceases to flow to said solenoid 20, thus said spring 22 is decompressed or released and said contacts 42 and 52 come together. This also actuates said ratchet 58 one notch at a time, through said link means 63, thus bringing, through said arm 59, one of said contacts, 68, 68*a*, 68*b* or 68*c*, on fixed frame 62, whichever is next in position, into contact with a wire 72 extending from said closed contacts 42 and 52. Thus one of said wires 70, 70*a*, 70*b* or 70*c*, that extends from one of the latter contacts 68, 68*a*, 68*b* or 68*c*, to one of said neon tubes 74, 74*a*, 74*b*, or 70*c*, serves to illuminate it, thereby illuminating an image provided by the latter.

What I claim is:

1. In a television receiver system including a cathode ray tube and an on-off switch, the improvement comprising:

display means disposed with said tube for displaying an auxiliary message on the screen area of said tube;

switching means for interconnecting said display means with the high voltage anode of said tube, to energize and illuminate said display means when said switching means are closed and for disconnecting said display means from said anode when said switching means are opened; and actuating means interconnected with the on-off switch of said system for opening said switching means to deenergize said display means in response to said on-off switch being turned on and for closing said switching means to energize said display means in response to said on-off switch being turned off.

2. The improvement of claim 1 in which said display means includes at least one neon lamp.

3. The improvement of claim 1 in which said actuating means includes a solenoid energized in response to said on-off switch of said system.

4. The improvement of claim 1 in which said display means includes a plurality of display units, and said switching means includes selector means for selectively interconnecting with said successive ones of said display units on each successive cycle of operation of said on-off switch.

5. The improvement of claim 1 in which said display means is disposed inside said cathode ray tube.

* * * * *